United States Patent [19]

Ostrom et al.

[11] Patent Number: 4,738,293

[45] Date of Patent: Apr. 19, 1988

[54] BALL HITCH COVER

[76] Inventors: Raymond Ostrom, 9653-16th Ave. S., Bloomington, Minn. 55420; Charles Delaney, 8404-61st Ave. NW., Anoka, Minn. 55303

[21] Appl. No.: 51,833

[22] Filed: May 20, 1987

[51] Int. Cl.$^4$ .................. B65D 65/02; B60D 1/06; B60R 27/00
[52] U.S. Cl. .................. 150/52 R; 150/52 K; 280/507
[58] Field of Search .................. 150/52 R, 52 L, 52 K; 280/507; D12/162

[56] References Cited

U.S. PATENT DOCUMENTS

| D. 158,372 | 5/1950 | Gee | D12/162 |
|---|---|---|---|
| D. 190,636 | 6/1961 | Schlosser | D12/162 |
| 2,517,176 | 8/1950 | Brock | 280/507 |
| 2,616,717 | 11/1952 | Dunlap | 280/507 |
| 2,618,489 | 11/1952 | Bishop | 280/507 |
| 2,714,912 | 8/1955 | Gonnella | 150/52 R |
| 3,228,445 | 1/1966 | Mayotte | 150/52 R |
| 3,260,537 | 7/1966 | Kelley | 280/507 |
| 3,596,926 | 8/1971 | Randall | 280/507 |
| 4,181,320 | 1/1980 | Wellborn, Jr. | 280/507 |

FOREIGN PATENT DOCUMENTS

| 215507 | 6/1958 | Australia | 150/52 R |
|---|---|---|---|
| 1097291 | 1/1961 | Fed. Rep. of Germany | 280/507 |
| 1407224 | 6/1965 | France | 280/507 |
| 2426583 | 1/1980 | France | 280/507 |
| 2432947 | 4/1980 | France | 280/507 |
| 359361 | 2/1962 | Switzerland | 280/507 |

Primary Examiner—William Price
Assistant Examiner—Sue A. Weaver

[57] ABSTRACT

A decorative cover unit for the ball hitch of a towing vehicle to cover the ball when not in towing use. The cover unit includes a decorative head portion in various shapes and forms and a ball receiving and protective portion including an adjustable member receivable therein such that the unit may cover the commercially available and recognized sizes of ball hitches. The basic unit includes the decorative head portion and a ball covering portion of a first size to be received over a two inch ball hitch with an insert to reduce the internal size of the unit to receive a ball of 1⅞ inch diameter. The primary unit provides a certain degree of flexibility to frictionally capture the ball and the insert unit provides frictional capturing capabilities to the primary unit and to a ball of the smaller diameter. The insert is of a length to provide proper frictional contact and is of a length to provide holding contact to the ball hitch.

5 Claims, 1 Drawing Sheet

BALL HITCH COVER

FIELD OF THE INVENTION

This invention relates generally to covers for ball hitches and more specifically to the cover unit which will accommodate the standard sized ball hitches for towing and towed vehicles and which frictionally engages the various sized ball hitches.

SHORT SUMMARY OF THE INVENTION

A ball hitch cover including a decorative head portion and a generally vertical ball hitch receiving portion of a first pre-determined size with an insert receivable therein to accommodate ball hitches of a second, smaller size. The ball hitch concept is to provide a decorative and protective covering for the ball hitch of a vehicle and, it is well known in the art that ball hitches are of various size and the applicant's concept is to provide a hitch cover for accommodation of the sizes provided. The unit is frictionally held to the ball hitch in either size and form of the invention and the size alteration of the invention is obtained with a frictionally positionable sleeve within the basic unit.

BACKGROUND AND OBJECTS OF THE INVENTION

The applicant has searched the prior patented and commercially available art and as a result of this search has found no commercially applicable art and has found only the following listed U.S. patents pertinent thereto. These patents are:

Wellborn, Jr., U.S. Pat. No. 4,181,320; Mayotte, U.S. Pat. No. 3,228,445; Bishop, U.S. Pat. No. 2,618,489; Gonnella, U.S. Pat. No. 2,714,912; and Kelley, U.S. Pat. No. 3,260,537.

All of these art references are related to ball hitch covers particularly adapted to cover ball hitch various sizes. None of these patents disclose an insert device and they primarily rely upon mechanical sizing devices and flexible leaf systems which are spreadable to accommodate the balls of various sizes.

With the applicant's device a basic unit is provided which includes the decorative head and is adapted to fit the larger diameter ball hitch with an insert provided for insertion therein to accommodate the ball hitch of the lesser diameter.

It is therefore an object of the applicant's invention to provide a cover for a ball hitch for a towing vehicle which incorporates a decorative upper portion and a lower ball covering portion which lower ball covering portion will accommodate the ball hitches of various sizes.

It is a further object of the applicant's invention to provide a cover for a ball hitch which incorporates an upper artistic head portion with a lower ball covering portion having a first primary size to receive and cover a ball of a first designated size with an insert member receivable therein to reduce the size of the receiving passage for accommodation and receipt of a ball of a second reduced size.

It is still a further object of the applicant's invention to provide a ball hitch cover which includes an upper artistic decorative portion and a lower ball receiving and covering portion with an insert insertable into the ball receiving portion such that the combined unit will be receivable and positionable on ball hitches of various sizes and will be frictionally held thereon.

These and other objects and advantages of the applicant's invention will more fully appear from a consideration of the accompanying drawings and disclosure.

SHORT DESCRIPTION OF THE DRAWINGS

DESCRIPTION OF A PREFERRED FORM OF THE INVENTION

Figure 1:
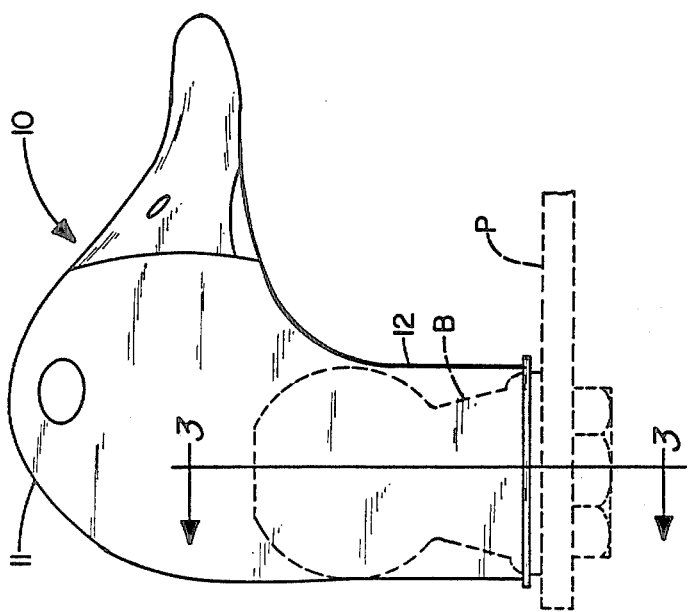
FIG. 1 is a side elevation of the ball hitch cover embodying the concepts of applicant's invention and illustrating the same in covering position over a typical ball hitch which is illustrated in dotted lines.

In accordance with the accompanying drawings the entire ball hitch cover unit is generally designated 10 and is illustrated in its useable position in FIG. 1. As illustrated in FIG. 1 the cover 10 incorporates an artistic upper portion 11, in the selected form, the head of a duck, and a lower trailer hitch ball receptacle ball portion 12. As illustrated in FIG. 1 the ball structure includes a mounting plate P and a ball unit B arranged thereon. The entire concept of the invention is to provide a cover for the ball for protection against rust and the like and to provide a decorative unit which covers the ball during non-towing operations.

Figure 2:
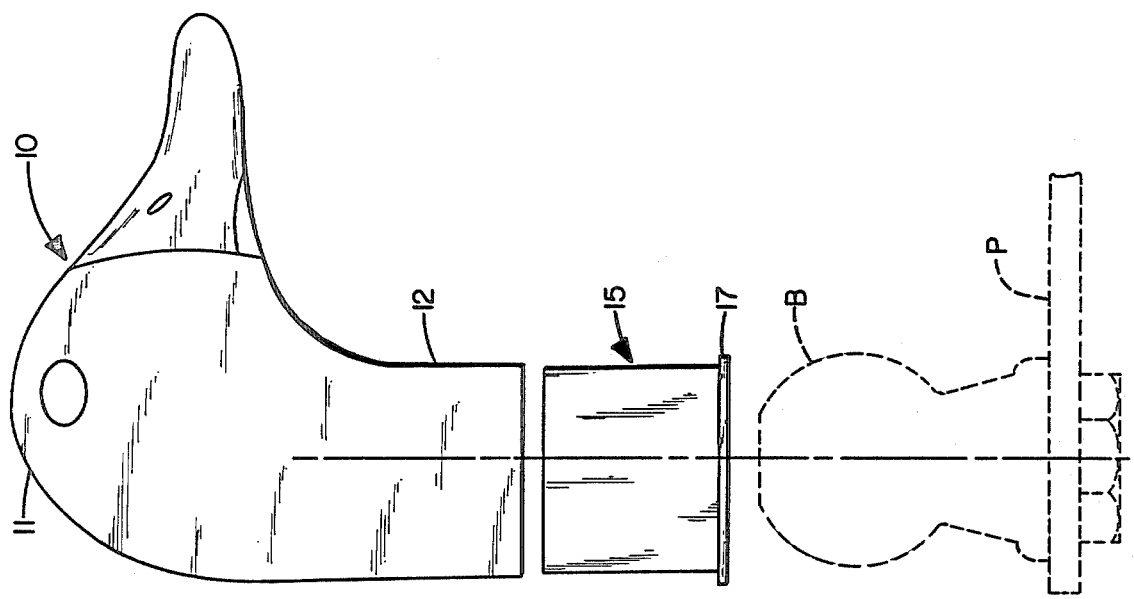
FIG. 2 is a side elevation similar to FIG. 1 in exploded condition which illustrates the elements of the ball hitch cover in solid lines with the ball hitch illustrated in dotted lines therebelow.

As particularly illustrated in FIG. 2 the unit 10 includes a lower connective portion and covering portion 12 of a first predetermined diameter of a first predetermined size as illustrated at 12a to engage with and cover a hitch ball of a two inch diameter.

The unit is made of a flexible, and preferably plastic material to allow certain extensions and flexing thereof to fit over and engage with the larger diameter ball hitch. The lower portion of the unit 12 is of a size to normally extend from a position adjacent the mounting plate P, over the lower connective portions of the ball, upwardly past the major diameter thereof and extending upwardly therefrom to completely encompass the ball unit. In this first form of the invention the sizing and arrangement of the unit is for placement on the larger two inch ball hitch. The flexibility of the material allows the unit to be inserted directly over the ball hitch and substantially slide thereover to be in relative abutting relationship to the plate P of the mounting unit.

Figure 3:
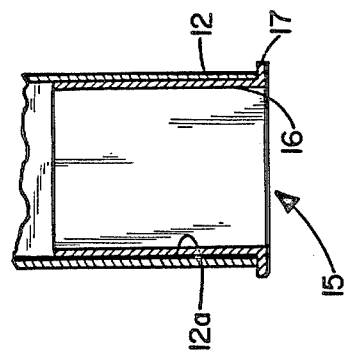
FIG. 3 is a vertical section taken substantially along line 3—3 of FIG. 1 to illustrate the primary and insert ball cover.

In a modified form of the invention an insert, generally designated 15 is provided and this insert member includes a generally longitudinally extending cylindrical member 16 having a radially outwardly extending shoulder 17 on the lowermost end thereof such that the unit 15 is insertable into and frictionally held within the lower end 12 of the primary unit 10. As particularly illustrated in FIG. 3 the insertion of member 15 will reduce the internal ball receiving dimension of the device to accommodate the ball hitch of reduced diameter.

It should be obvious that, when the insert 15 is inserted into the primary member ball receiving portion 12 that it will be frictionally held therein and shoulder 17 will prevent over insertion and will also permit removal of the insert unit when changing balls from the small to the increased diameter size.

With the materials being substantially flexible, resilient and preferrably of a plastic nature there is a certain integrity of frictional contact to prevent ease of removal of either the individual unit 10 from a ball of large diameter, the removal of the insert 15 from the primary unit 10 and removal from the reduced device from the ball B.

The invention then may be reduced to a consideration of a first diameter unit to be received about and frictionally attached to surround a ball of a first given size with an insert receivable and frictionally held therein to receive and be mounted upon a ball of a reduced diameter. The concept provides ease of removal of the insert from the primary unit and prevents insertion of the insert into an area which would prevent retrieval and removal therefrom.

It should be obvious that the applicants have provided a new and unique ball hitch cover which incorporates coverage and protection of ball hitches of various sizes.

What is claimed is:

1. A removable covering for towing ball hitches for covering the same when not in towing useage and removable for attachment of a hitch, and adaptable for various sizes of such balls, including:
   a. a first cover portion having a first internal diameter to be received over the major diameter of a ball of a first predetermined size and extending longitudinally to cover the height of such ball;
   b. insert means receivable longitudinally into said first cover portion to reduce the internal diameter thereof to be received over the major diameter of a ball of a second predetermined, lesser diameter; and,
   c. said insert means and said internal diameter of said first cover portion providing a friction fit therebetween whereby said covering is adaptable for use with towing balls of different major diameters.

2. The structure set forth in claim 1 and said first cover portion and said insert means being formed of a flexible material for adaptation to the selected balls and for receipt of said insert means into said cover portion for frictional connection of the same.

3. The structure set forth in claim 1 and said insert means including:
   a. a longitudinally extending member receivable into said first portion; and
   b. a radially extending flange on one end thereof to abut with a lower end of said first portion to limit nsertion thereof into said first portion.

4. The structure set forth in claim 3 and said insert means being of a longitudinal length to extend from said lower end of said first portion to the major diameter of the towing ball being received therein.

5. The structure set forth in claim 1 and said first cover portion being provided with a decorative head at the uppermost end thereof.

* * * * *